United States Patent
Fukushima et al.

(10) Patent No.: US 10,685,674 B2
(45) Date of Patent: Jun. 16, 2020

(54) ASSISTED MAGNETIC RECORDING MEDIUM AND MAGNETIC STORAGE APPARATUS

(71) Applicant: SHOWA DENKO K.K., Tokyo (JP)

(72) Inventors: Takayuki Fukushima, Chiba (JP); Hisato Shibata, Chiba (JP); Yuji Umemoto, Chiba (JP); Kazuya Niwa, Chiba (JP); Lei Zhang, Chiba (JP); Takehiro Yamaguchi, Chiba (JP); Chen Xu, Chiba (JP); Tomoo Shige, Chiba (JP); Hiroshi Koyanagi, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 16/445,772

(22) Filed: Jun. 19, 2019

(65) Prior Publication Data
US 2019/0392863 A1    Dec. 26, 2019

(30) Foreign Application Priority Data

Jun. 25, 2018  (JP) .................................. 2018-120043

(51) Int. Cl.
   *G11B 5/56*   (2006.01)
   *G11B 5/65*   (2006.01)
   G11B 5/00    (2006.01)
(52) U.S. Cl.
   CPC ...... *G11B 5/656* (2013.01); *G11B 2005/0021* (2013.01)

(58) Field of Classification Search
   CPC .......................... G11B 5/56; G11B 2005/0021
   USPC ............................................................ 360/135
   See application file for complete search history.

(56) References Cited

U.S. PATENT DOCUMENTS

| | | | | |
|---|---|---|---|---|
| 6,567,247 B1* | 5/2003 | Araki | ..................... | B82Y 10/00 360/324.12 |
| 7,382,589 B2* | 6/2008 | Lin | ........................ | G11B 5/127 360/324.11 |
| 7,588,842 B1* | 9/2009 | Abarra | ..................... | G11B 5/66 428/828.1 |
| 2010/0190035 A1* | 7/2010 | Sonobe | ..................... | G11B 5/66 428/827 |
| 2012/0134049 A1* | 5/2012 | Maeda | ..................... | G11B 5/65 360/110 |
| 2012/0261777 A1* | 10/2012 | Shukh | ..................... | H01L 43/08 257/421 |

FOREIGN PATENT DOCUMENTS

JP    2015-005326    1/2015

* cited by examiner

*Primary Examiner* — Allen T Cao
(74) *Attorney, Agent, or Firm* — IPUSA, PLLC

(57) ABSTRACT

A magnetic recording medium includes: a substrate; an underlayer; a magnetic layer including an alloy having an $L1_0$ type crystal structure; and a protective layer, wherein the substrate, the underlayer, the magnetic layer, and the protective layer are stacked in the recited order. A pinning layer is further included between the magnetic layer and the protective layer, and the pinning layer includes a magnetic material including Co and includes at least one metal selected from the group consisting of Cu, Ag, Au, and Al.

7 Claims, 2 Drawing Sheets

ASSISTED MAGNETIC RECORDING MEDIUM AND MAGNETIC STORAGE APPARATUS

CROSS-REFERENCE TO RELATED APPLICATIONS

This application is based on and claims priority to Japanese Patent Application No. 2018-120043 filed on Jun. 25, 2018, the entire contents of which are incorporated herein by reference.

BACKGROUND OF THE INVENTION

1. Field of the Invention

The disclosures herein generally relate to an assisted magnetic recording medium and a magnetic storage apparatus.

2. Description of the Related Art

In recent years, demand for increasing the storage capacity of hard disk drives has been growing.

However, with existing recording methods, it is difficult to increase the recording density of hard disk drives.

An assisted magnetic recording method is a technique that has been actively studied and attracted attention as a next generation recording method.

The assisted magnetic recording method is a recording method in which a magnetic head irradiates a magnetic recording medium with near-field light or a microwave to locally decrease the coercivity of the irradiated area to write magnetic information. Here, a magnetic recording medium that is irradiated with near-field light is referred to as a heat-assisted magnetic recording medium, and a magnetic recording medium that is irradiated with a microwave is referred to as a microwave-assisted magnetic recording medium.

In an assisted magnetic recording method, as a material that constitutes a magnetic layer, a material having a high Ku is used, such as a Fe—Pt alloy having an $L1_0$ type structure ($Ku \approx 7 \times 10^7$ erg/cm$^3$), or a Co—Pt alloy having an $L1_0$ type structure ($Ku \approx 5 \times 10^7$ erg/cm$^3$).

When a high Ku material is used as the material constituting a magnetic layer, KuV/kT increases. Here, Ku is a magnetic anisotropy constant of magnetic grains, V is a volume of magnetic grains, k is the Boltzmann constant, and T is a temperature. Accordingly, the volume of the magnetic grains can be reduced while suppressing demagnetization. In the heat-assisted magnetic recording method, by making magnetic grains finer, transition width can be narrowed. As a result, noise can be reduced and the signal-to-noise ratio (SNR) can be improved.

Patent Document 1 describes a heat-assisted magnetic recording medium having a structure in which a first magnetic layer and a second magnetic layer are stacked in sequence on a substrate. Here, the first magnetic layer includes a FePt alloy having an $L1_0$ structure or a CoPt alloy having an $L1_0$ structure. Also, the second magnetic layer is an alloy of an HCP structure containing Co.

RELATED-ART DOCUMENTS

Patent Documents

[Patent Document 1] Japanese Laid-Open Patent Publication No. 2015-005326

Generally, when magnetic information is written to a magnetic layer of an assisted magnetic recording medium, laser light or the like is emitted from a magnetic head to locally decrease the coercivity of the irradiated area.

However, when the coercive force recovers immediately after the magnetic information is written to the magnetic layer, the magnetization of a portion around a write bit and a large number of magnetic grains constituting the write bit is reversed, and noise occurs at the time of reading the assisted magnetic recording medium.

It is an object of one aspect of the present invention to provide an assisted magnetic recording medium having an excellent SNR.

SUMMARY OF THE INVENTION (1) An assisted magnetic recording medium includes: a substrate; an underlayer; a magnetic layer including an alloy having an $L1_0$ type crystal structure; and a protective layer, wherein the substrate, the underlayer, the magnetic layer, and the protective layer are stacked in the recited order. A pinning layer is further included between the magnetic layer and the protective layer, and the pinning layer includes a magnetic material including Co and includes at least one metal selected from the group consisting of Cu, Ag, Au, and Al.

(2) The assisted magnetic recording medium according to (1), wherein a total content of the metal in the pinning layer is in a range of 1 at % to 20 at %.

(3) The assisted magnetic recording medium according to (1), wherein a formula of $200 \leq P_{Tc} - M_{Tc}$ is satisfied where the Curie temperature of the magnetic material is $P_{TS}$ [K], and the Curie temperature of the alloy having the $L1_0$ type crystal structure is $M_{Tc}$ [K].

(4) The assisted magnetic recording medium according to (1), wherein the metal is Cu.

(5) The assisted magnetic recording medium according to (1), wherein the pinning layer further includes an oxide of at least one kind of metal selected from the group consisting of Ni, Fe, and Co.

(6) The assisted magnetic recording medium according to (1), wherein the pinning layer has a thickness in a range of 0.5 nm to 3 nm.

(7) A magnetic storage apparatus includes: the assisted magnetic recording medium according to (1).

According to one aspect of the present invention, it is possible to provide an assisted magnetic recording medium having an excellent SNR.

DESCRIPTION OF THE PREFERRED EMBODIMENTS

In the following, an embodiment of the present invention will be described with reference to the accompanying drawings. The present invention is not limited to the embodiment as will be described below, and various variations and modifications may be made with respect to the following embodiment without departing from the scope of the present invention.

(Assisted Magnetic Recording Medium)

Figure 1:
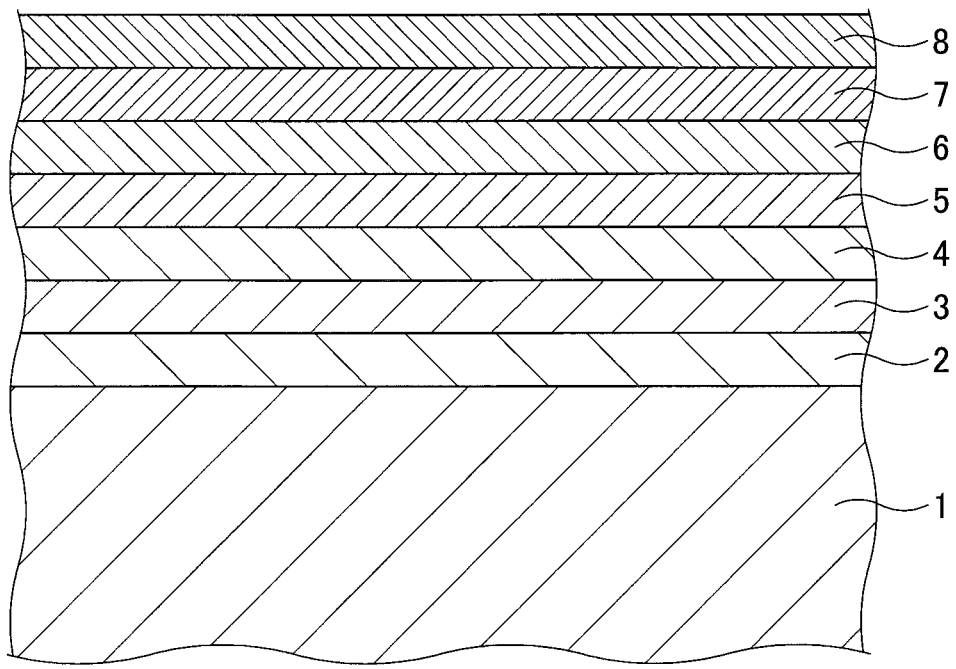
FIG. 1 is a schematic diagram illustrating an example of an assisted magnetic recording medium according to an embodiment.

FIG. 1 illustrates an example of an assisted magnetic recording medium 100 according to an embodiment.

The assisted magnetic recording medium 100 includes a substrate 1, a seed layer 2, a first underlayer 3, a second underlayer 4, a magnetic layer 5 including an alloy having an $L1_0$ type crystal structure, a pinning layer 6, a protective layer 7, and a lubricant layer 8 in this order.

The pinning layer 6 includes a magnetic material including Co and includes at least one metal selected from the group consisting of Cu, Ag, Au, and Al.

The pinning layer 6 is in contact with the magnetic layer 5. The pinning layer 6 has a function of pinning the magnetization direction of magnetic grains when magnetic information is written to the magnetic layer 5.

Generally, when magnetic information is written to a magnetic layer of an assisted magnetic recording medium, laser light or the like is emitted from a magnetic head to locally decrease the coercivity of the irradiated area. As described above, when the coercive force recovers immediately after the magnetic information is written to the magnetic layer, the magnetization of a portion around a write bit and a large number of magnetic grains constituting the write bit is reversed, and noise occurs at the time of reading the assisted magnetic recording medium. It is considered that this phenomenon is caused by magnetization reversal of a portion of magnetic grains due to fluctuations in the magnetization direction of grains having a small grain diameter contained in the magnetic grains having an $L1_0$ type structure. At this time, in the thermal assisted magnetic recording medium, thermal fluctuations occur at grains having a small grain diameter contained in the magnetic grains having an $L1_0$ type structure.

In the assisted magnetic recording medium 100, the pinning layer 6 is in contact with the magnetic layer 5, and the pinning layer 6 includes a magnetic material including Co having a high Curie temperature. Therefore, it is possible to pin the magnetization direction of the magnetic particles when magnetic information is written to the magnetic layer 5, and it is possible to suppress reversal of the magnetization of the magnetic grains. As a result, the assisted magnetic recording medium 100 has a high SNR.

Also, because the pinning layer 6 includes at least one metal selected from the group consisting of Cu, Ag, Au, and Al, after heating the magnetic layer 5, the assisted magnetic recording medium 100 is easily cooled. That is, because Cu, Ag, Au, and Al have a higher thermal conductivity than that of Co, heat generated when the magnetic layer 5 is heated tends to be released into the air through the pinning layer 6, the protective layer 7, and the lubricant layer 8. As a result, even when the value of $P_{Tc}-M_{Tc}$ is not sufficiently large, it is possible to exert an effect of pinning the magnetization direction of the magnetic grains when magnetic information is written to the magnetic layer 5.

The content of the at least one metal in the pinning layer 6 is preferably in a range of 1 at % to 20 at %, and is more preferably in a range of 2.5 at % to 10 at %. When the content of the at least one metal in the pinning layer 6 is 1 at % or more, the heat dissipation property of the pinning layer 6 is further enhanced. When the content of the at least one metal in the pinning layer 6 is 20 at % or less, the crystallinity of the pinning layer 6 is further enhanced, and the effect of pinning the magnetization direction of the magnetic grains when magnetic information is written to the magnetic layer 5 is further enhanced.

Here, it is preferable that a formula of $M_{Tc}<P_{Tc}$ is satisfied where the Curie temperature of the magnetic material included in the pinning layer 6 is $P_{Tc}$ [K], and the Curie temperature of the alloy having the $L1_0$ type crystal structure included in the magnetic layer 5 is $M_{Tc}$ [K]. Thereby, it is possible to effectively suppress reversal of the magnetization direction of the magnetic grains when magnetic information is written to the magnetic layer 5.

It is preferable to satisfy a formula of $200 \leq P_{Tc}-M_{Tc}$. It is more preferable to satisfy a formula of $300 \leq P_{Tc}-M_{Tc}$. It is particularly preferable to satisfy a formula of $500 \leq P_{Tc}-M_{Tc}$. When $200 \leq P_{Tc}-M_{Tc}$, the pinning layer 6 can more effectively suppress reversal of the magnetization of the magnetic grains.

Note that the optimum value of $P_{Tc}-M_{Tc}$ depends on the material(s) constituting the pinning layer 6, the thickness of the pinning layer 6, the material(s) constituting the magnetic layer 5, the thickness of the magnetic layer 5, and the grain size distribution of the magnetic grains constituting the magnetic layer 5.

The Curie temperatures of typical magnetic materials are indicated below.

Co: 1388K
Fe: 1044K
Ni: 624K
Fe—Pt alloy: approximately 750K
Sm—Co alloy: approximately 1000K
Co—Cr—Pt-based alloy: 400K to 600K From the values of Curie temperature of magnetic materials, the composition and the Curie temperature of the magnetic material included in the pinning layer 6 can be determined. Among the practical magnetic materials, Co has the highest Curie temperature. Here, as $P_{Tc}-M_{Tc}$ increases, the effect of pinning the magnetization direction of the magnetic grains when magnetic information is written to the magnetic layer 5 can be ensured. Therefore, the pinning layer 6 includes a magnetic material including Co.

The content of Co in the pinning layer 6 is preferably in a range of 75 at % to 97 at %, and is more preferably in a range of 85 at % to 95 at %. When the content of Co in the pinning layer 6 is 75 at % or more, the crystallinity of the pinning layer 6 is further enhanced, and the effect of pinning the magnetization direction of the magnetic grains when magnetic information is written to the magnetic layer 5 is further enhanced. When the content of Co in the pinning layer 6 is 97 at % or less, the heat dissipation property of the pinning layer 6 is further enhanced.

As a magnetic material, the pinning layer 6 may include, for example, Co, a Co—Pt alloy, a Co—B alloy, a Co—Si alloy, a Co—C alloy, a Co—Ni alloy, a Co—Fe alloy, a Co—Pt—B alloy, a Co—Pt—Si alloy, a Co—Pt—C alloy, a Co—Ge alloy, a Co—BN alloy, a Co—$Si_3N_4$ alloy, or the like. Among these, Co is preferable in terms of the effect of pinning the magnetization direction of the magnetic grains when magnetic information is written to the magnetic layer 5.

As a metal included in the pinning layer 6, Cu is particularly preferable. Cu has favorable compatibility with a magnetic material including Co, in particular, the crystallinity of the pinning layer 6 is enhanced. Therefore, the smoothness of the growth surface of the pinning layer 6 is enhanced. As a result, because the surface smoothness of the assisted magnetic recording medium 100 before forming the lubricant layer 8 is increased, the SNR of the assisted magnetic recording medium 100 is increased.

Note that the magnetic material included in the pinning layer 6 may include an element that is included in the magnetic layer 5 or an element that has little effect even when diffusing into the magnetic layer 5.

The content of one or more elements other than Co in the magnetic material included in the pinning layer 6 is preferably 15 at % or less, and is more preferably 10 at % or less. When the content of elements other than Co in the magnetic material is less than or equal to 15 at %, it is possible to exert an effect of pinning the magnetization direction of the magnetic grains when magnetic information is written to the magnetic layer 5 without significantly lowering the saturation magnetization and/or the Curie temperature of Co.

Elements other than Co include, for example, Pt, B, Si, C, Ni, Fe, Ge, N, and the like.

Here, in a case where a pinning layer 6 having a non-granular structure is formed, depending on the deposition conditions, the magnetic grains constituting the magnetic layer 5 are exchange-coupled to each other via the pinning layer 6, and noise may occur at the time of writing information to the magnetic layer 5.

For such a case, it is preferable to form a pinning layer 6 having a granular structure. In this case, it is particularly preferable that the magnetic grains constituting the magnetic layer 5 and the magnetic grains constituting the pinning layer 6 are columnar crystals that are continuous in the thickness direction. Accordingly, it is possible to block exchange coupling between the magnetic grains constituting the pinning layer 6, and it is possible to suppress exchange coupling between the magnetic grains constituting the magnetic layer 5 via the pinning layer 6. As a result, generation of noise at the time of writing information to the magnetic layer 5 can be effectively suppressed.

At this time, the pinning layer 6 preferably further includes an oxide of at least one kind of metal selected from the group consisting of Ni, Fe, and Co. Accordingly, even when the substrate 1 is at a high temperature at the time of forming the pinning layer 6 in a manufacturing process of the assisted magnetic recording medium 100, an oxide of at least one kind of metal described above does not easily decompose, and does not easily diffuse into the inside of the magnetic grains or other layers. Further, even if an oxide of at least one kind of metal described above diffuses into the inside of the magnetic grains or other layers, effects on the magnetic properties of the magnetic layer 5 and the pinning layer 6 are small.

The content of an oxide of at least one kind of metal described above in the pinning layer 6 is preferably in a range of 10 mol % to 50 mol %, and is more preferably in a range of 15 mol % to 45 mol %. When the content of an oxide of at least one kind of metal described above in the pinning layer 6 is 10 mol % or more and 50 mol % or less, the pinning layer 6 having a granular structure can be formed, and the magnetization direction of the magnetic grains when magnetic information is written to the magnetic layer 5 can be pinned.

The thickness of the pinning layer 6 is preferably in a range of 0.5 nm to 3 nm, and is more preferably in a range of 1 nm to 3 nm. When the thickness of the pinning layer 6 is 0.5 nm or more, the effect of pinning the magnetization direction of the magnetic grains when magnetic information is written to the magnetic layer 5 is further enhanced. When the thickness of the pinning layer 6 is 3 nm or less, noise from the pinning layer 6 is suppressed, and the heat dissipation property of the pinning layer 6 is further enhanced.

Note that the optimum value of the thickness of the pinning layer 6 depends on the value of $P_{Tc}-M_{Tc}$, the material(s) constituting the pinning layer 6, the material(s) constituting the magnetic layer 5, the thickness of the magnetic layer 5, the grain size distribution of the magnetic grains constituting the magnetic layer 5, and the like.

Although the assisted magnetic recording medium 100 includes the substrate 1, the seed layer 2, the first underlayer 3, the second underlayer 4, and the magnetic layer 5 in the recited order, the seed layer 2, the first underlayer 3, and the second underlayer 4 preferably lattice-match the magnetic layer 5. This further enhances the (001) orientation of the magnetic layer 5.

For example, the seed layer 2, the first underlayer 3, and the second underlayer 4 may be a Cr layer, a W layer, and a MgO layer that are (100)-oriented.

A lattice misfit (or mismatch) among the respective layers of the seed layer 2, the first underlayer 3, and the second underlayer 4 is preferably 10% or less.

In order to enhance the (100) orientation of the first underlayer 3 and the second underlayer 4, a Cr layer or a Cr alloy layer having a bcc structure or an alloy layer having a B2 structure may be further formed under the seed layer 2, the first underlayer 3, or the second underlayer 4.

Examples of the Cr alloy include, for example, a Cr—Mn alloy, a Cr—Mo alloy, a Cr—W alloy, a Cr—V alloy, a Cr—Ti alloy, a Cr—Ru alloy, and the like.

Examples of the alloy having a B2 structure include, for example, a Ru—Al alloy, a Ni—Al alloy, and the like.

Also, an oxide may be added to at least one layer of the seed layer 2, the first underlayer 3, and the second underlayer 4 to enhance lattice matching with the magnetic layer 5.

Examples of such an oxide include an oxide of at least one kind of metal selected from the group consisting of Cr, Mo, Nb, Ta, V, and W. In particular, $CrO$, $Cr_2O_3$, $CrO_3$, $MoO_2$, $MoO_3$, $Nb_2O_5$, $Ta_2O_5$, $V_2O_3$, $VO_2$, $WO_2$, $WO_3$, and $WO_6$ are preferable.

The content of oxide in at least one layer of the seed layer 2, the first underlayer 3, and the second underlayer 4 is preferably in a range of 2 mol % to 30 mol %, and is more preferably in a range of 10 mol % to 25 mol %. When the content of oxide in at least one layer of the seed layer 2, the first underlayer 3, and the second underlayer 4 is greater than or equal to 2 mol %, the (001) orientation of the magnetic layer 5 is further enhanced. When the content of oxide in at least one layer of the seed layer 2, the first underlayer 3, and the second underlayer 4 is less than or equal to 30 mol %, the (001) orientation of the at least one layer is further enhanced.

The magnetic layer 5 is (001)-oriented because of including an alloy having an $L1_0$ type structure.

The alloy having the $L1_0$ type structure is preferably a Fe—Pt alloy or a Co—Pt alloy.

In order to promote the ordering of the alloy having the $L1_0$ type structure of the magnetic layer 5, it is preferable to conduct a heat treatment at the time of depositing the magnetic layer 5. In this case, a metal such as Ag, Au, Cu, or Ni may be added to the alloy having the $L1_0$ type structure to reduce the heating temperature (ordering temperature).

The crystal grains of the alloy having the $L1_0$ type structure contained in the magnetic layer 5 are preferably magnetically isolated. Hence, it is preferable that the magnetic layer 5 further includes one or more kinds of substance selected from the group consisting of $SiO_2$, $TiO_2$, $Cr_2O_3$, $Al_2O_3$, $Ta_2O_5$, $ZrO_2$, $Y_2O_3$, $CeO_2$, $GeO_2$, MnO, TiO, ZnO, $B_2O_3$, C, B, and BN. Thus, exchange coupling between crystal grains can be further certainly divided, and the SNR of the assisted magnetic recording medium 100 can be further enhanced.

The average grain diameter of the magnetic grains contained in the magnetic layer 5 is preferably 10 nm or less in terms of increasing the recording density.

Generally, as the average grain diameter of the magnetic grains decreases, the effects of thermal fluctuations immediately after magnetic information is written to the magnetic layer 5 increase.

However, the pinning layer 6 is in contact with the magnetic layer 5 and the magnetization direction of the magnetic grains can be pinned. Therefore, immediately after writing magnetic information to the magnetic layer 5, it is possible to reduce generation of noise resulting from reversal of the magnetization of a part of the magnetic grains. As a result, the SNR is enhanced when the magnetic information is reproduced.

Note that the average grain diameter of the magnetic grains can be determined using a planar TEM observation image. For example, from the observation image of TEM, the grain diameters (diameters equivalent to circles) of 200 magnetic grains can be measured, and the grain diameter at the integration value 50% can be defined as the average grain diameter.

Here, the average grain boundary width of the magnetic grains is preferably in a range of 0.3 nm to 2.0 nm.

The magnetic layer 5 may have a structure of multilayers.

It is preferable that in the magnetic layer 5, two or more layers are stacked each of which has a different composition including one or more kinds of substance selected from the group consisting of $SiO_2$, $TiO_2$, $Cr_2O_3$, $Al_2O_3$, $Ta_2O_5$, $ZrO_2$, $Y_2O_3$, $CeO_2$, $GeO_2$, MnO, TiO, ZnO, $B_2O_3$, C, B, and BN.

The thickness of the magnetic layer 5 is preferably in a range of 1 nm to 20 nm, and is more preferably in a range of 3 nm to 15 nm. When the thickness of the magnetic layer 5 is 1 nm or more, the reproduction output is enhanced, and when the thickness of the magnetic layer 5 is 20 nm or less, enlargement of the crystalline grains can be suppressed.

Here, in a case where the magnetic layer 5 has a structure of multilayers, the thickness of the magnetic layer 5 means the total thickness of all layers.

The protective layer 7 includes carbon.

A method of forming the protective layer 7 is not limited to a particular method. For example, a RF-CVD (Radio Frequency-Chemical Vapor Deposition) method that decomposes a source gas made of hydrocarbon by high-frequency plasma, an IBD (Ion Beam Deposition) method that ionizes a source gas by electrons emitted from a filament, a FCVA (Filtered Cathodic Vacuum Arc) method that uses a solid carbon target without using a source gas, or the like may be used to form the protective layer 7.

The thickness of the protective layer 7 is preferably in a range of 1 nm and 6 nm. The floating properties of the magnetic head become satisfactory when the thickness of the protective layer 7 is 1 nm or more. Also, a magnetic spacing decreases and the SNR of the assisted magnetic recording medium 100 is enhanced when the thickness of the protective layer 7 is 6 nm or less.

The lubricant layer 8 contains a perfluoropolyether-based lubricant.

(Magnetic Storage Apparatus)

A magnetic storage apparatus according to the present embodiment is not limited to a particular structure, as long as the magnetic storage apparatus includes an assisted magnetic recording medium according to the embodiment described above.

The magnetic storage apparatus according to the present embodiment includes, for example, a magnetic recording medium drive unit for rotating an assisted magnetic recording medium, a magnetic head provided with a near field light generation element on its tip, a magnetic head drive unit for moving the magnetic head, and a recording and reproducing signal processing system.

Also, the magnetic head includes, for example, a laser light generation unit for heating the assisted magnetic recording medium, and a waveguide for guiding laser light generated from the laser light generation unit to the near field light generation element.

Figure 2:
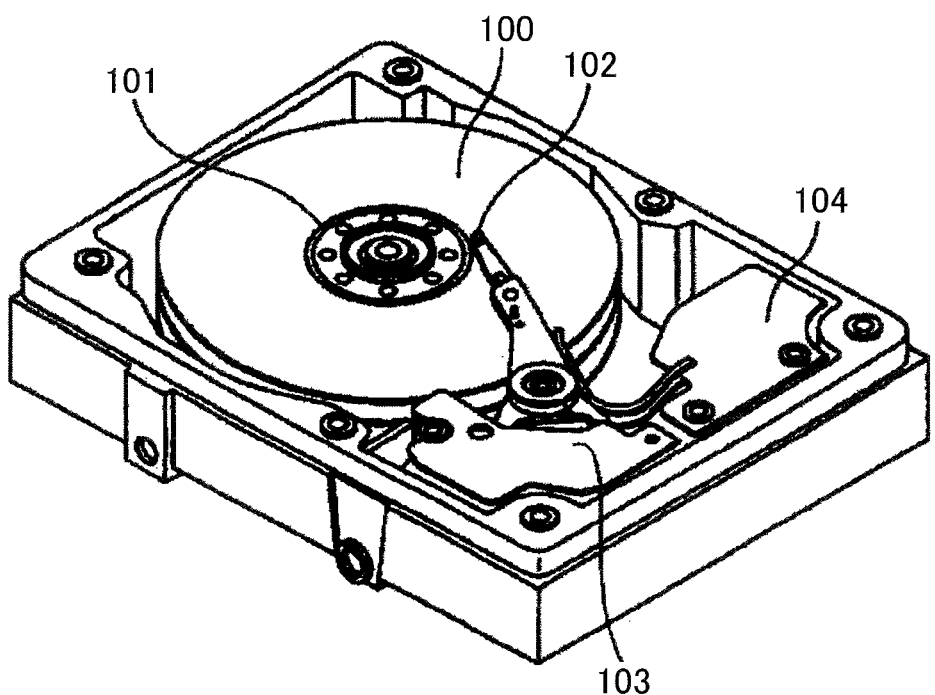
FIG. 2 is a schematic diagram illustrating an example of a magnetic storage apparatus according to the embodiment.

FIG. 2 illustrates an example of a magnetic storage apparatus according to the present embodiment.

The magnetic storage apparatus illustrated in FIG. 2 includes an assisted magnetic recording medium 100, a magnetic recording medium drive unit 101 for rotating the assisted magnetic recording medium 100, a magnetic head 102, a magnetic head drive unit 103 for moving the magnetic head 102, and a recording and reproducing signal processing system 104.

Figure 3:
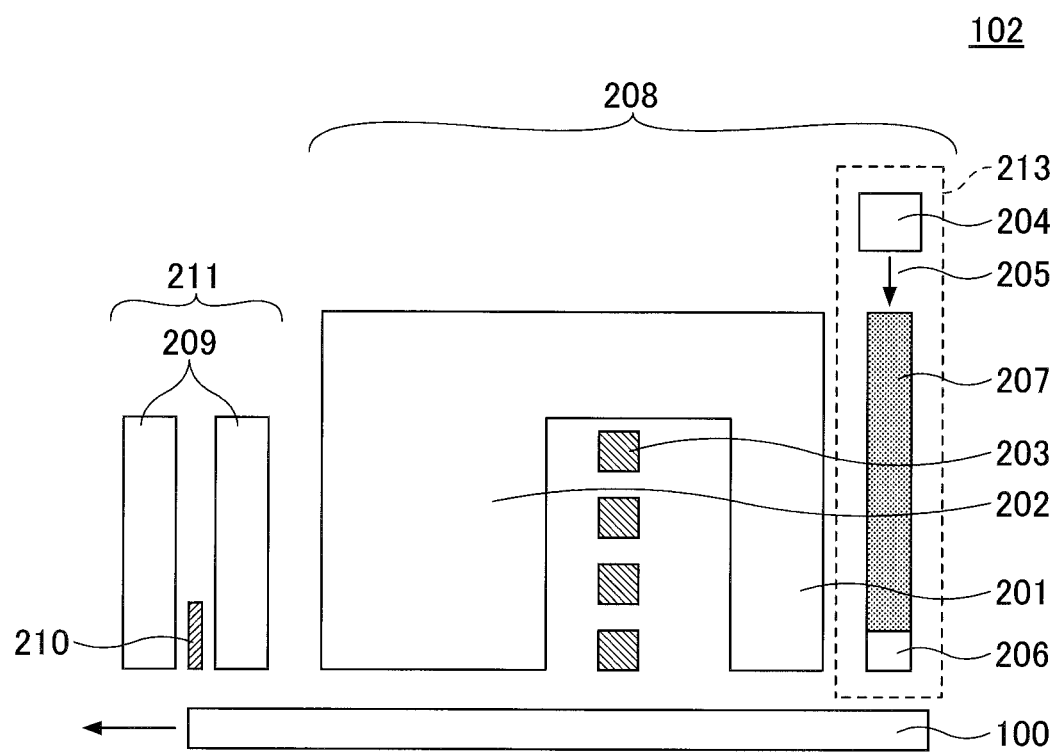
FIG. 3 is a schematic diagram illustrating an example of a magnetic head used in the magnetic storage apparatus of FIG. 2.

FIG. 3 illustrates an example of the magnetic head 102.

The magnetic head 102 includes a recording head 208 and a reproducing head 211.

The recording head 208 includes a main magnetic pole 201, an auxiliary magnetic pole 202, a coil 203 for generating a magnetic field, a laser diode (LD) 204, which serves as a laser light generation unit, and a waveguide 207 for transmitting laser light 205 generated at the LD 204 to a near field light generation element 206.

The reproducing head 211 includes a reproducing element 210 sandwiched by shields 209.

EXAMPLES

In the following, Examples of the present invention will be described. Note that the present invention is not limited to Examples described below.

Examples 1 to 11 and Comparative Examples 1 to 4

On a glass substrate having an outer diameter of 2.5 inches, an alloy layer of Cr-50 at % Ti (in which the content of Cr is 50 at % and the content of Ti is 50 at %) having a thickness of 50 nm was deposited and heated to 350° C. Thereafter, a Cr layer (seed layer) having a thickness of 15 nm, a W layer (first underlayer) having a thickness of 30 nm, and a MgO layer (second underlayer) having a thickness of 3 nm were deposited, and then heated to 650° C. Thereafter, an alloy layer of (Fe-50 at % Pt)-40 mol % C having a thickness of 2 nm and an alloy layer of (Fe-50 at % Pt)-15 mol % $SiO_2$ having a thickness of 4.5 nm were deposited to from a magnetic layer. Thereafter, a pinning layer having a thickness of 1.2 nm was deposited, and then a carbon layer (protective layer) having a thickness of 4 nm was formed. Finally, a perfluoropolyether-based lubricant was applied on the protective layer to form a lubricant layer having a thickness of 1.5 nm to obtain an assisted magnetic recording medium.

Here, the materials constituting the pinning layers are indicated in Table 1.

Note that the Curie temperature ($P_{Tc}$) of the magnetic material (Co) contained in the pinning layer is 1388 K, and the Curie temperature ($M_{Tc}$) of the alloy (Fe-50 at % Pt alloy) having the $L1_0$ type crystal structure contained in the magnetic layer is 700 K.

(Ra)

An AFM was used to measure the arithmetic mean roughness Ra of the surface before applying the lubricant for the assisted magnetic recording medium. The measurement results of Ra of the assisted magnetic recording mediums are indicated in Table 1.

(SNR)

The SNR was measured by recording an all-one pattern signal with a linear recording density of 1500 kFCI on each magnetic recording medium by using the magnetic head 102 (see FIG. 3). Here, power supplied to the laser diode was adjusted such that a track width MWW, which was defined as the half width of a track profile, was 60 nm.

Table 1 indicates the evaluation results of Ra and SNR of the assisted magnetic recording mediums.

TABLE 1

|     | PINNING LAYER | Ra [nm] | SNR [dB] |
| --- | --- | --- | --- |
| E1  | Co-3 at % Cu | 0.39 | 11.9 |
| E2  | Co-5 at % Cu | 0.37 | 12.7 |
| E3  | Co-10 at % Cu | 0.38 | 13.7 |
| E4  | Co-5 at % B-5 at % Cu | 0.38 | 12.5 |
| E5  | Co-5 at % Au | 0.41 | 13.4 |
| E6  | Co-5 at % Ag | 0.43 | 12.9 |
| E7  | Co-3 at % Al | 0.42 | 11.9 |
| E8  | Co-5 at % Al | 0.44 | 11.8 |
| E9  | Co-5 at % B-5 at % Al | 0.44 | 11.6 |
| E10 | (Co-10 at % Cu)-10 mol % CoO | 0.36 | 12.7 |
| E11 | (Co-10 at % Cu)-8 mol % FeO | 0.36 | 12.6 |
| CE1 | Co | 0.44 | 9.7 |
| CE2 | Co-5 at % Cr | 0.44 | 9.5 |
| CE3 | Co-20 mol % CoO | 0.42 | 11.2 |
| CE4 | Co-18 mol % FeO | 0.42 | 11.1 |

From Table 1, it is apparent that, in each of Examples 1 to 11, the assisted magnetic recording medium has a high SNR.

Conversely, in each of Comparative Examples 1 to 3, the magnetic recording medium has a low SNR because of not including one or more kinds of metal selected from the group consisting of Cu, Ag, Au, and Al.

What is claimed is:

1. An assisted magnetic recording medium comprising:
   a substrate;
   an underlayer;
   a magnetic layer including an alloy having an $L1_0$ type crystal structure; and
   a protective layer,
   wherein the substrate, the underlayer, the magnetic layer, and the protective layer are stacked in the recited order,
   wherein a pinning layer is further included between the magnetic layer and the protective layer, and
   wherein the pinning layer includes a magnetic material including Co and includes at least one metal selected from the group consisting of Cu, Ag, Au, and Al.

2. The assisted magnetic recording medium according to claim 1, wherein a total content of the metal in the pinning layer is in a range of 1 at % to 20 at %.

3. The assisted magnetic recording medium according to claim 1, wherein a formula of $200 \leq P_{Tc} - M_{Tc}$ is satisfied where the Curie temperature of the magnetic material is $P_{Tc}$ [K], and the Curie temperature of the alloy having the $L1_0$ type crystal structure is $M_{Tc}$ [K].

4. The assisted magnetic recording medium according to claim 1, wherein the metal is Cu.

5. The assisted magnetic recording medium according to claim 1, wherein the pinning layer further includes an oxide of at least one kind of metal selected from the group consisting of Ni, Fe, and Co.

6. The assisted magnetic recording medium according to claim 1, wherein the pinning layer has a thickness in a range of 0.5 nm to 3 nm.

7. A magnetic storage apparatus comprising:
   the assisted magnetic recording medium according to claim 1.

* * * * *